US010520642B2

(12) United States Patent
Wortley

(10) Patent No.: US 10,520,642 B2
(45) Date of Patent: Dec. 31, 2019

(54) ROCK MOVEMENT SENSOR FOR USE DURING BLASTING

(71) Applicant: MINDSPARK TECHNOLOGIES PTY LTD, Brendale, Queensland (AU)

(72) Inventor: Peter James Wortley, Albany Creek (AU)

(73) Assignee: MINDSPARK TECHNOLOGIES PTY LTD, Brendale, Queensland (AU)

(*) Notice: Subject to any disclaimer, the term of this patent is extended or adjusted under 35 U.S.C. 154(b) by 0 days.

(21) Appl. No.: 15/526,859

(22) PCT Filed: Nov. 20, 2015

(86) PCT No.: PCT/AU2015/050732
§ 371 (c)(1),
(2) Date: May 15, 2017

(87) PCT Pub. No.: WO2016/077889
PCT Pub. Date: May 26, 2016

(65) Prior Publication Data
US 2017/0315264 A1    Nov. 2, 2017

(30) Foreign Application Priority Data
Nov. 21, 2014 (AU) .............................. 2014904698

(51) Int. Cl.
*G01V 15/00* (2006.01)
*F42D 3/04* (2006.01)
(Continued)

(52) U.S. Cl.
CPC .............. *G01V 15/00* (2013.01); *E21C 37/00* (2013.01); *E21F 17/18* (2013.01); *F42D 3/04* (2013.01);
(Continued)

(58) Field of Classification Search
CPC ....................................................... G01V 15/00
(Continued)

(56) References Cited

U.S. PATENT DOCUMENTS 6,121,773 A *  9/2000  Taicher .................... G01V 3/32
                                                    324/300
8,955,916 B2 *  2/2015  Spathis ................... E21C 37/16
                                                    102/301
(Continued)

FOREIGN PATENT DOCUMENTS

AU    2006235872 B2    5/2008
WO    2008144811 A1   12/2008

OTHER PUBLICATIONS

Thornton DM., "The Application of Electronic Monitors to Understand Blast Movement Dynamics and Improve Blast Designs", Symposium on Rock Fragmentation by Blasting 2009, [ retrieved from internet on Feb. 4, 2016] URL: hhttp://www.bmt.com.au/wp-content/uploads/2010/12/2009_FragBlast.pdf Introduction and section 2.2.

(Continued)

*Primary Examiner* — Tarun Sinha
(74) *Attorney, Agent, or Firm* — David D. Brush; Westman, Champlin & Koehler, P.A.

(57) ABSTRACT

The present invention provides a rock movement sensor including an inertial measurement assembly, a control assembly responsive to said inertial measurement assembly and a communication assembly coupled to the control assembly. The control assembly is arranged to determine a displacement associated with a blast or drop based on signals from the inertial measurement assembly. The communication assembly is preferably a wireless communication assembly. A surface unit corresponding to the rock movement sensor is provided which includes a processor programmed to operate a communications assembly to (Continued)

receive displacement data from the rock movement sensor. Consequently, the movement of an ore body due to a blast may be determined by locating a number of the rock movement sensors at known locations about the ore body prior to the blast and subsequently retrieving data values indicating a displacement relative to the known locations from the rock movement sensor post blast.

23 Claims, 16 Drawing Sheets

(51) Int. Cl.
      *E21C 37/00*     (2006.01)
      *G01P 15/02*     (2013.01)
      *E21F 17/18*     (2006.01)
      *G01V 1/18*     (2006.01)
      *G01P 13/00*     (2006.01)

(52) U.S. Cl.
      CPC .............. *G01P 15/02* (2013.01); *G01V 1/184* (2013.01); *G01P 13/00* (2013.01)

(58) Field of Classification Search
      USPC ........................................................ 73/514.01
      See application file for complete search history.

(56) References Cited

U.S. PATENT DOCUMENTS

| | | | | |
|---|---|---|---|---|
| 2005/0012499 A1* | 1/2005 | La Rosa | ................. | E21B 47/02 |
| | | | | 324/207.15 |
| 2007/0131031 A1* | 6/2007 | Tsai | ...................... | G06F 1/3215 |
| | | | | 73/514.01 |
| 2013/0274954 A1* | 10/2013 | Jordan, Jr. | ............. | G06F 17/00 |
| | | | | 701/1 |

OTHER PUBLICATIONS

International Search Report dated Feb. 11, 2016 for corresponding International Patent Application PCT/AU2015/050732 filed on Nov. 20, 2015.
Written Opinion of the International Searching Authority dated Feb. 11, 2016 for corresponding International Patent Application PCT/AU2015/050732 filed on Nov. 20, 2015.

* cited by examiner

ROCK MOVEMENT SENSOR FOR USE DURING BLASTING

CROSS-REFERENCE TO RELATED APPLICATIONS

This Application is a Section 371 National Stage Application of International Application No. PCT/AU2015/050732, filed Nov. 20, 2015, which is incorporated by reference in its entirety and published as WO 2016/077889 A1 on May 26, 2016, in English.

TECHNICAL FIELD

The present invention relates to an apparatus and method for gauging the movement of an ore body due to blasting. The invention may also be used for measuring parameters associated with other significant rapid displacement events. For example it may be used to measure parameters associated with a drop or fall.

BACKGROUND TO THE INVENTION

Any references to methods, apparatus or documents of the prior art are not to be taken as constituting any evidence or admission that they formed, or form part of the common general knowledge.

Geologists spend many hours and much computing time modelling the distribution of minerals throughout a rock mass. Significant investments in exploratory drilling and assaying are also made before geostatistical techniques are applied to the collected data to interpolate the extents and distribution of the valuable metals contained in the ore. A large body of work exists in this field, such that the block model of the resource is a reasonably accurate reflection of the mineral that is actually in the ground prior to blasting. Blasting of both the mineral bearing, and waste rock, imparts energy to break the rock mass into smaller particles which allows excavation and further size reduction using methods such as crushing. Invariably some of this blasting energy is expended moving the rock mass also, displacing the known ore boundaries from where they were originally defined by the grade control engineers or geologists.

Failure to accurately account for ore movement due to blasting will result in misclassification, from ore to waste; low to high grade; sulfide to oxide; etc. Collectively this is referred to as ore loss and dilution and the financial consequences of getting this wrong can be significant.

FIG. 1 illustrates an extreme example of how ore loss and dilution might occur in a blast. In this case, the ore has moved entirely beyond the polygon it would have occupied prior to blasting. If ore movement were not taken into account, the ore (i.e. the rock that contains the commodity of interest, e.g. gold or copper) would be excavated as waste and discarded (ore loss), and waste material would be sent to the processing plant, where valuable energy and water would be expended in crushing and grinding processes for no return at all (dilution).

Traditionally, ore movement of the rock is monitored using some sort of marker (either electronic or physical). These must be placed into the rock before the blast, their location surveyed, and then found again after the blast to allow movement vectors to be calculated using the surveyed coordinates. It will be realized that it would be desirable if an alternative approach were provided which did not require the user having to measure the start and finish locations of the sensor.

Another problem that occurs in the mining industry is that of measuring the depth and angle of drill holes. It is important to be able to accurately measure the depth and angle of drill holes because this ultimately defines the distribution of explosive energy in the blasted rock mass. For example, if blast holes are too short, there will be insufficient breakage of the rock at the bottom of the blast hole. This will result in hard digging or even the inability to excavate the blast to the target level. Poor fragmentation will also have significant impact on the downstream processes such as crushing and grinding. There are other reasons too for wanting to be able to check that holes have been drilled to plan. One reason is that inaccurate drilling may reflect an inability of the site to meet fundamental metrics that define how close to best practice they are. In short, sloppy drilling will lead to sloppy blasting and then poor diggability and fragmentation.

It would also be advantageous if more information could be gathered during a blast. For example, it would be helpful if more information than merely the pre-blast and the post-blast locations of the marker might be determined.

It is an aspect of the present invention to provide a rock movement sensor that overcomes or at least alleviates a problem described above. It is another aspect to provide a useful rock movement sensor as an alternative to prior art devices.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

In a first aspect, but not necessarily the broadest aspect the present invention provides a rock movement sensor comprising: an inertial measurement assembly; a control assembly responsive to said inertial measurement assembly; and a communication assembly coupled to the control assembly; wherein the control assembly is arranged to determine a displacement associated with a blast or drop based on signals from the inertial measurement assembly.

In one embodiment of the rock movement sensor, the communication assembly is a wireless communication assembly. In less preferred embodiments of the invention it may be configured to establish communications non-wirelessly, for example over a wire or cable.

In one embodiment the control assembly comprises a suitably programmed processor.

Typically the wireless communication assembly includes at least one RF coil. In one embodiment the at least one RF coil comprises three coils each being substantially orthogonal to the other two. It is desirable that three substantially orthogonal coils be used in order that alignment with a remote corresponding antenna may be optimized.

In one embodiment, the inertial measurement assembly comprises at least one inertial measurement unit. The inertial measurement unit may comprise at least a triaxial accelerometer and a triaxial gyroscope. In one embodiment the inertial measurement assembly further includes a triaxial magnetometer.

In one embodiment, the inertial measurement assembly includes a dedicated processor in communication with the controller. If desired for higher accuracy the inertial measurement assembly may comprise a plurality of inertial measurement units (IMUs).

In one embodiment the controller includes a non-volatile memory. For example the controller may comprise a microprocessor in communication with a non-volatile memory.

The controller may be arranged to record a trajectory of the rock measurement sensor. In one embodiment of the invention the controller is arranged to determine an orientation of the rock movement sensor based on signals from the internal measurement assembly.

In one embodiment the controller is arranged to transmit data associated with the blast via one of the coils wherein the one of the coils is selected based on the determined orientation.

In one embodiment the rock movement sensor comprises a housing. The housing may comprise at least one shock absorbing member. For example, the at least one shock absorbing member may comprise high density foam disposed adjacent at least one end of the housing.

According to another aspect of the present invention there is provided a surface unit corresponding to the previously described rock movement sensor comprising: a processor; and a communications assembly coupled to the processor and arranged to communicate with the rock movement sensor; wherein the processor is programmed to operate the communications assembly to receive displacement data from the rock movement sensor.

In one embodiment, the communications assembly comprises a wireless communications assembly that is arranged to establish wireless communications with the rock sensor although in less preferred embodiments of the invention it may be configured to establish communications non-wirelessly, for example over a wire or cable.

The surface unit may be programmed to store surface locations for a plurality of survey holes wherein the surface locations are each associated with a unique identifier of a corresponding rock movement sensor.

The surface unit may include a magnetometer in communication with the processor, wherein the processer is programmed to operate the communications module to transmit heading data derived from the magnetometer to the rock movement sensor for calibration thereof.

According to a further aspect of the present invention there is provided a system for monitoring ore movement due to blasting comprising: a plurality of rock movement sensors each arranged to record data associated with displacements and to transmit said data; at least one surface unit arranged to detect transmission of the displacement data of each of the plurality of rock movement sensors and to record displacement data corresponding to each of the plurality of rock movement sensors.

In one embodiment, the rock movement sensors are each arranged to wirelessly transmit said data and the at least one surface unit is arranged to detect said wireless transmissions although a non-wireless connection, for example a wired connection might instead be used in less preferred embodiments of the invention.

According to another aspect of the present invention there is provided a method for detecting changes in position associated with a significant displacement event, comprising: locating a rock movement sensor at a known location prior to said event; and subsequent to the event retrieving data values indicating a displacement relative to the known location from the rock movement sensor.

In one embodiment, the data values are retrieved by wireless communication between the rock movement sensor and a surface unit though in other less preferred embodiments of the invention a non-wireless connection might be used instead.

Alternatively, the rock movement sensors may comprise a locator beacon, for example a radio beacon, so that they can be found subsequent to the blast, retrieved and interrogated to obtain the displacement data.

It will be apparent to one skilled in the art how the invention may be implemented in various alternative embodiments and alternative applications. However, although various embodiments of the present invention will be described herein, it is understood that these embodiments are presented by way of example only, and not limitation. As such, this description of various alternative embodiments should not be construed to limit the scope or breadth of the present invention. Furthermore, statements of advantages or other aspects apply to specific exemplary embodiments, and not necessarily to all embodiments covered by the claims.

Throughout the description and the claims of this specification the word "comprise" and variations of the word, such as "comprising" and "comprises" is not intended to exclude other additives, components, integers or steps.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
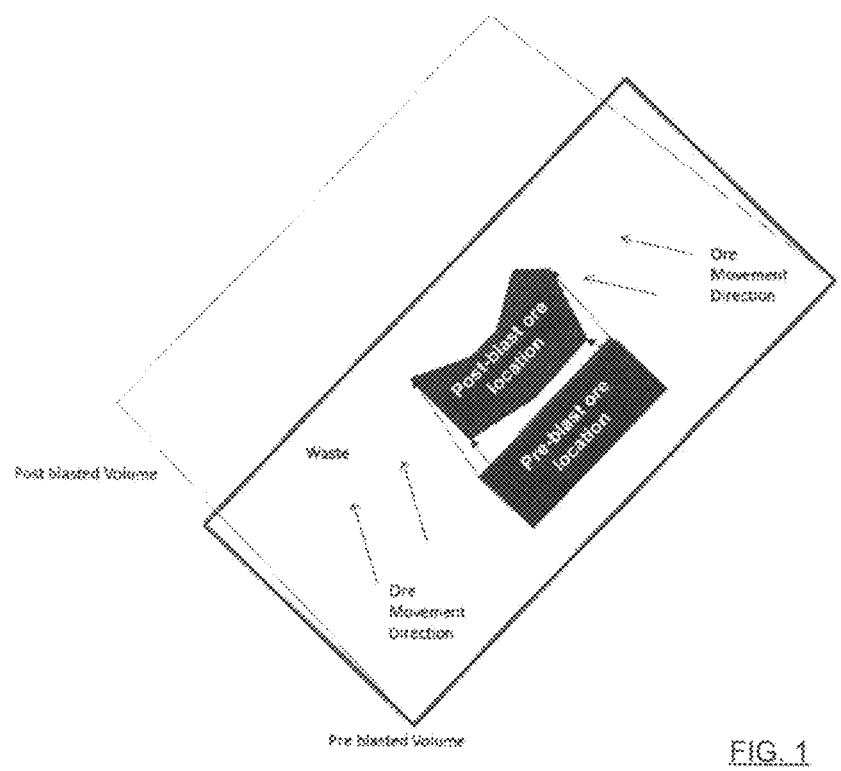
FIG. 1 is a diagram illustrating a typical displacement of an ore body due to a blast.
Figure 2:
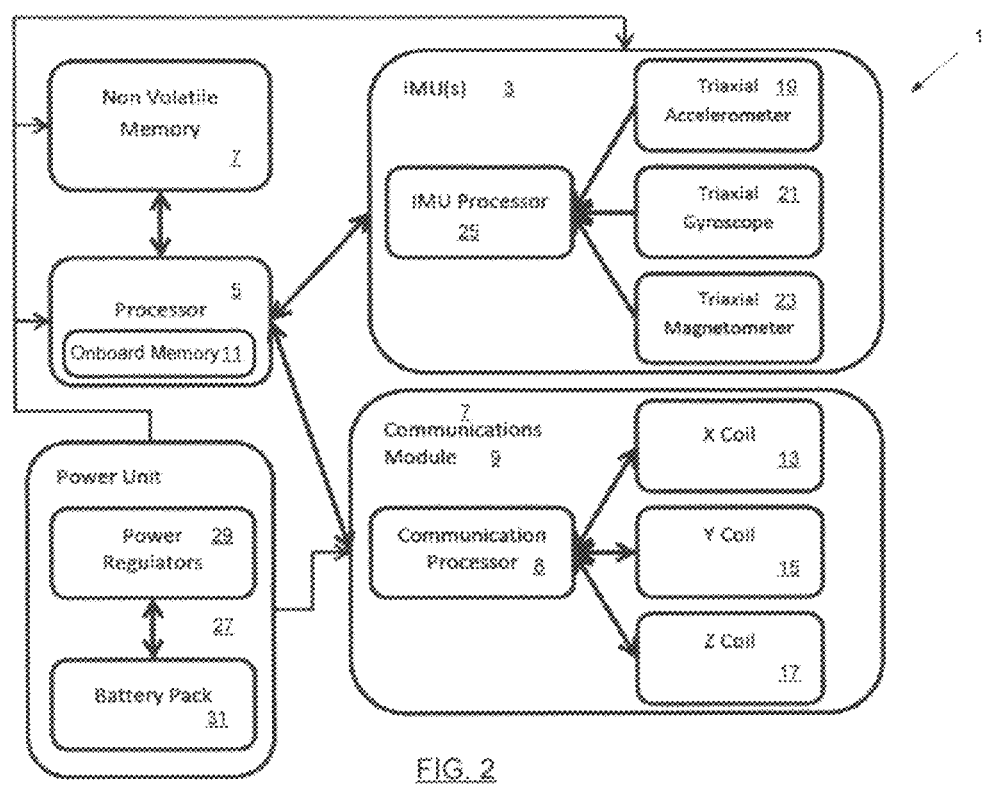
FIG. 2 is a block diagram of a rock movement sensor according to a preferred embodiment of the present invention.

Referring now to FIG. 2, there is depicted a rock movement sensor 1 for use during blasting according to a preferred embodiment of the present invention. The rock movement sensor 1 comprises an inertial measurement assembly in the form of an inertial measurement unit 3. The inertial measurement assembly could comprise a single triaxial accelerometer 19 and a single triaxial gyroscope 21. However, in the preferred embodiment the inertial measurement assembly further includes a triaxial magnetometer 23.

The inertial measurement assembly includes a dedicated IMU processor 25 which processes positional data from accelerometer 19, gyroscope 21 and magnetometer 23 as is known in the field of IMUs. The IMU processor 25 is in electrical communication with processor 5 via a serial data link. The IMU processor 25 samples the signals from each of the triaxial accelerometer, gyroscope and magnetometer at a sample rate of about 1 kHz. If desired, for higher accuracy, the inertial measurement assembly may comprise a plurality of inertial measurement units with a Kalman filter or similar used to process data therefrom.

The rock movement sensor 1 also includes a control assembly comprising a processor 5 and associated non-volatile memory 7. The processor is coupled to the inertial measurement unit 3 so that it is responsive to signals generated by the IMU 3. As will be described in more detail, the processor 5 executes instructions comprising firmware stored in onboard memory 11 in order that it may determine a displacement, such as a displacement associated with a blast or a drop, based on data signals from the IMU. The non-volatile memory is of a significant capacity (up to 1 Gb) so that the processor 5 can store not just the final destination of the RMS but also data points, or vectors, defining the path travelled, i.e. the trajectory of the unit during the blast or drop.

In a preferred embodiment of the invention the final displacement is calculated by summing all previous displacements. Kalman filtering is used since it constrains the movement based on all measurements.

The rock movement sensor 1 also includes a communications module 9 which is in electrical communication with the processor 5 via a serial interface and which is able to send and receive data, including the displacement data, to a remote base station.

The wireless communication assembly 9 includes at least one RF coil and in the presently described preferred embodiment three coils 13, 15, 17, each being orthogonal to the other two. It is desirable that three orthogonal coils be used in order that alignment with a remote corresponding antenna of the base station can be optimized for best minimizing data transmission error rate.

Each of the processor 5, non-volatile memory 7, inertial measurement unit 3 and communications module 9 receive power from a power unit 27 comprising a battery pack 31 and power regulator 29 as are commonly known in the art of electronics.

Figure 3:
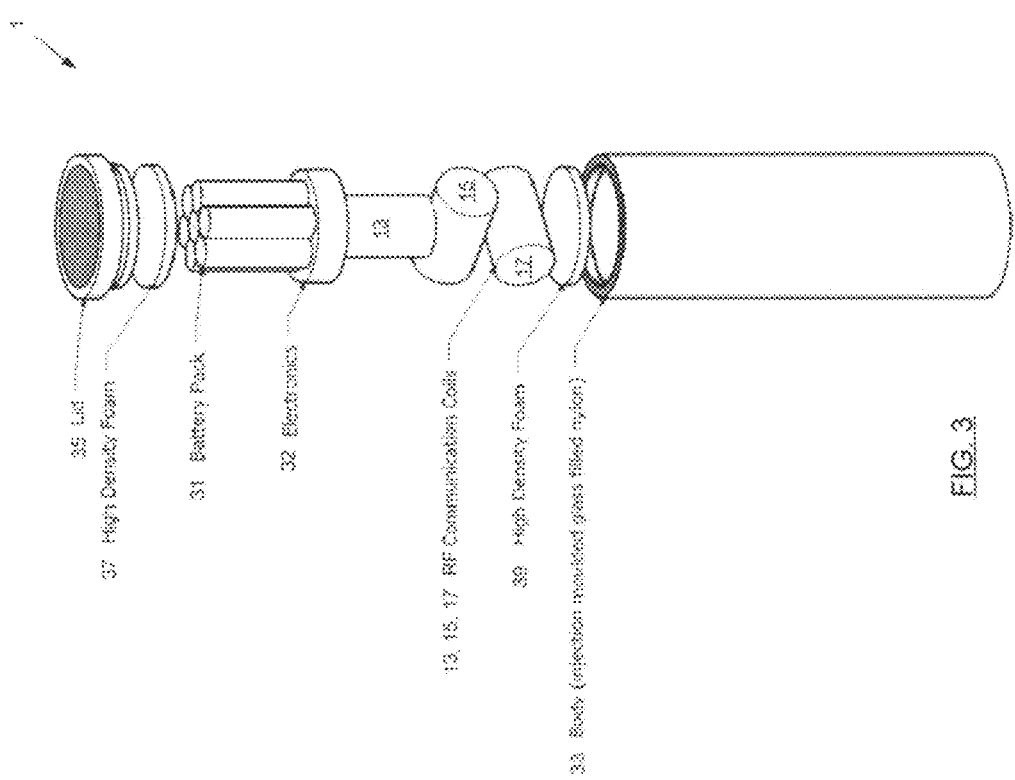
FIG. 3 is an exploded physical view of the rock movement sensor of FIG. 1.

Referring now to FIG. 3, there is provided an exploded view of the rock movement sensor 1. In the presently described preferred embodiment of the invention the rock movement sensor includes a housing in the form of a tubular body 33 and lid 35. The body 33 is formed of injection moulded glass filled nylon which is capable of withstanding the high forces associated with the use of the device in a blasting environment. Shock absorbing members in the form of high density foam disks 37, 39 are disposed at opposed ends of the body 33. The various components of the rock movement sensor, that have thus far been described with reference to FIG. 2, are located between the high density foam disks 37 and 39. The electronic circuitry is mounted on a support substrate, e.g. a printed circuit board (PCB) 32.

Figure 4:
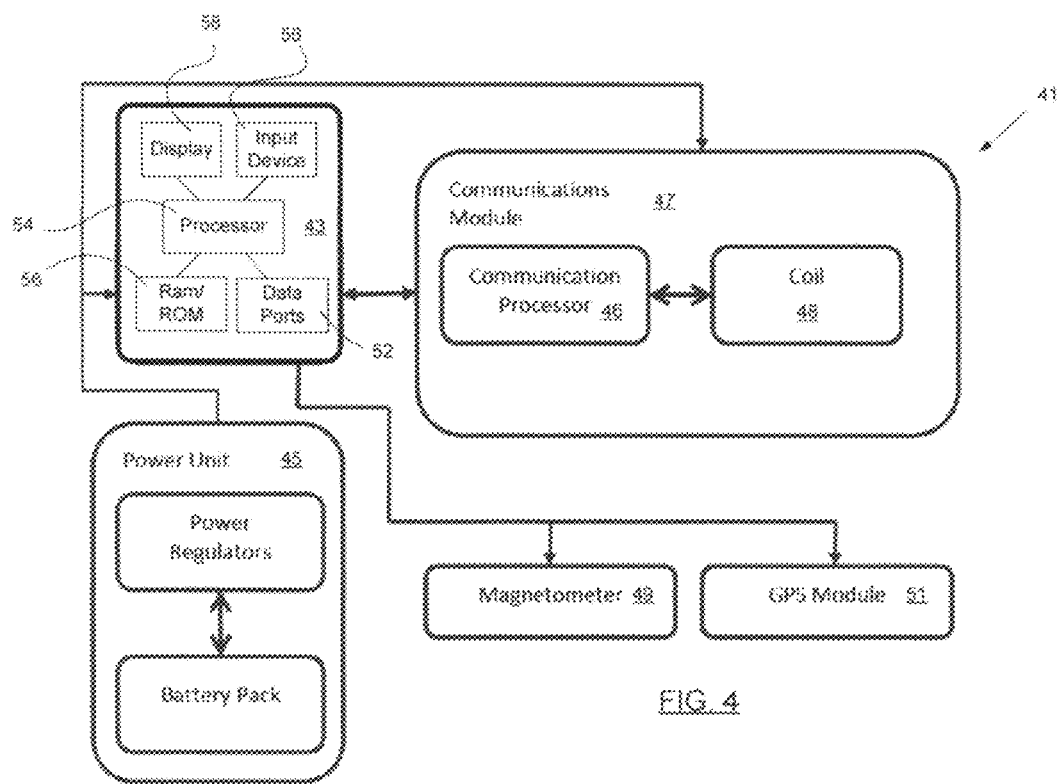
FIG. 4 is a block diagram of a surface unit according to a preferred embodiment of a further aspect of the present invention.

Referring now to FIG. 4, there is depicted a block diagram of a surface unit 41 which is arranged to wirelessly communicate with a plurality of rock movement sensors such as rock movement sensor 1.

The surface communications unit 41 consists of a communications module 47 which is coupled to an embedded computer 43. The embedded computer 43 includes a user display 58 and input device 56, e.g. a keyboard or touchscreen, and also a data port 52 such as a USB or serial port for data communications. It also includes memory 56 for an operating system and suitable application software as will shortly be described.

The communications module is used to transmit and receive data from the RMS 1. The embedded computer receives the data and displays it to a user and stores it for later retrieval and analysis. The surface unit also includes a magnetometer 49 and a GPS module 51 which are both coupled to the embedded computer 43. The magnetometer 49 is used to transmit true north to the RMS 1 when the RMS unit is still on the surface prior to installation before a blast. Similarly, the GPS module 51 may be used to determine an absolute position coordinate which is also transmitted to the RMS 1 or alternatively stored in the surface unit along with an ID of the associated RMS.

Figure 5:
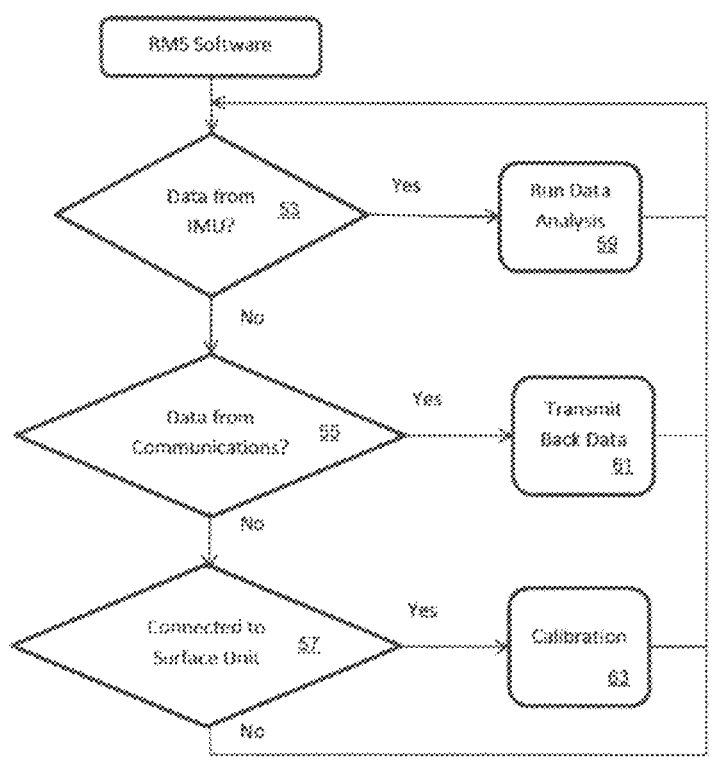
FIG. 5 is a high level flowchart of the firmware executed by a processor of the rock movement sensor of FIG. 2.

Referring now to FIG. 5, there is shown a high level flowchart of the firmware that is stored in on-board memory 11 of processor 5 of the RMS and which is executed by processor 5 during use of the RMS 1.

Initially, at decision box 53, the processor 5 checks to determine if data is being received from the IMU 3. If data is being received then control diverts to the Run Data Analysis routine 59. Otherwise the processor 5 proceeds to decision box 55. At decision box 55 the processor checks to determine if data is being received from the communications module 9. If data is being received from communications module 9 then control diverts to the Transmit Back Data routine 61. Otherwise the processor 5 proceeds to decision box 57. At decision box 57 the processor checks to determine if there is a data connection to the Surface Unit 41. If there is a data connection to the Surface Unit 41 then control diverts to the Calibration routine 63. Otherwise the processor loops back to decision box 53 from which the process repeats.

Figure 6:
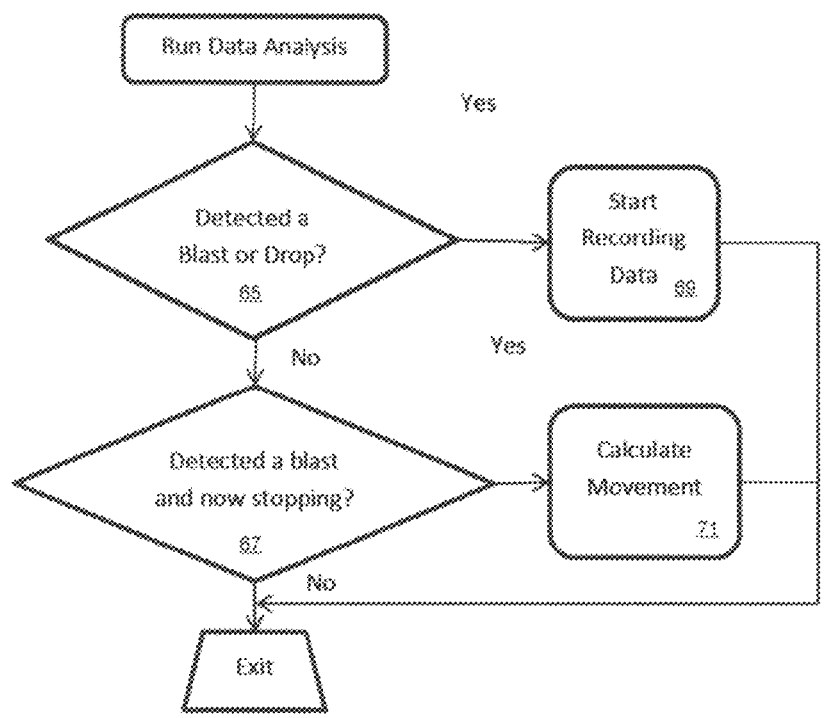
FIG. 6 is a flowchart of a routine of the flowchart of FIG. 5.

FIG. 6 is a flowchart of the Run Data Analysis routine 59. At box 65 the processor 5 analyses the data from the IMU 3 to determine if the RMS 1 has been subjected to a blast or a drop since the processor last cycled through the Run Data Analysis routine. This determination will typically comprise checking if successive data samples received from the IMU 3 exceed a predetermined threshold value indicative of a blast or a drop. If at box 65 the processor 3 determines that the RMS 1 has experienced a blast or a drop then control diverts to box 69. At box 69 the processor 3 commences recording data from the IMU 3 into the non-volatile memory 7. Alternatively, if at decision box 65 the processor does not detect a blast or a drop then the processor proceeds to box 67.

Blast movement is preceded by a shock wave, which saturates the accelerometer(s), this is significant because the RMS senses the saturation and is configured to start calculating movement after the initial shock wave and once both the accelerometers and gyroscopes detect movement. The duration of the blast movement is roughly 2 sec.

In the presently described preferred embodiment the drop measurement can be triggered by one of two significant events.
1. The release of the RMS from the surface device
2. A roughly vertical fall lasting a minimum of 400 msec and a maximum of 2 sec (minimum depth is 1 m, maximum is currently 15 m).

At box 67 the processor analyses the current data from the IMU 3 and also refers to recently recorded data from the IMU to determine if a significant displacement event, such as a blast or drop, has been detected and that event is now stopping.

If at box 67 the processor determines that there has been significant displacement event which is now stopping then at box 71 the processor processes recorded data to calculate the movement associated with the displacement event.

Figures 7, 8:
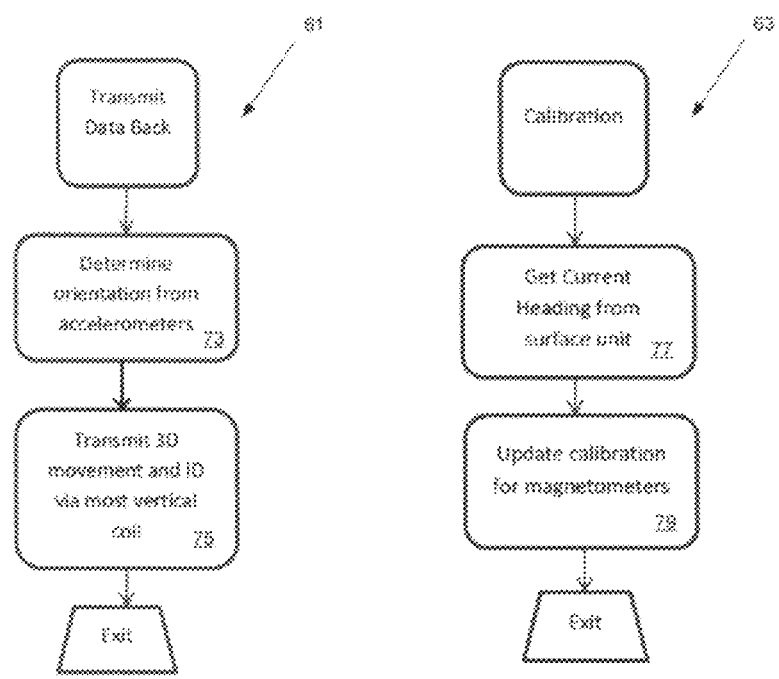
FIG. 7 is a flowchart of a routine of the flowchart of FIG. 5.
FIG. 8 is a flowchart of a routine of the flowchart of FIG. 5.

Referring now to FIG. 7 there is depicted a flowchart of the Transmit Data Back routine 61. At box 73 the processor 5 determines the orientation of the RMS 1 based on data from the IMU 3. At box 75, the processor 5 operates the communications module 9 to transmit the three dimensional blast displacement and the RMS's ID code via the most horizontal of the coils 13 to 17. This is so that the polarization of the transmit coil of the RMS 1 and of the coil of the communication module 47 of the surface unit 41 are aligned as best as possible, assuming that the surface unit coil is maintained horizontally.

Referring now to FIG. 8, there is depicted a flowchart of the Calibration routine 63. At box 77 the processor 77 requests and receives a current heading from the surface unit 41. At box 79 the processor 3 communicates with the IMU 3 for calibration of the triaxial magnetometer 23 of the IMU.

Figure 9:
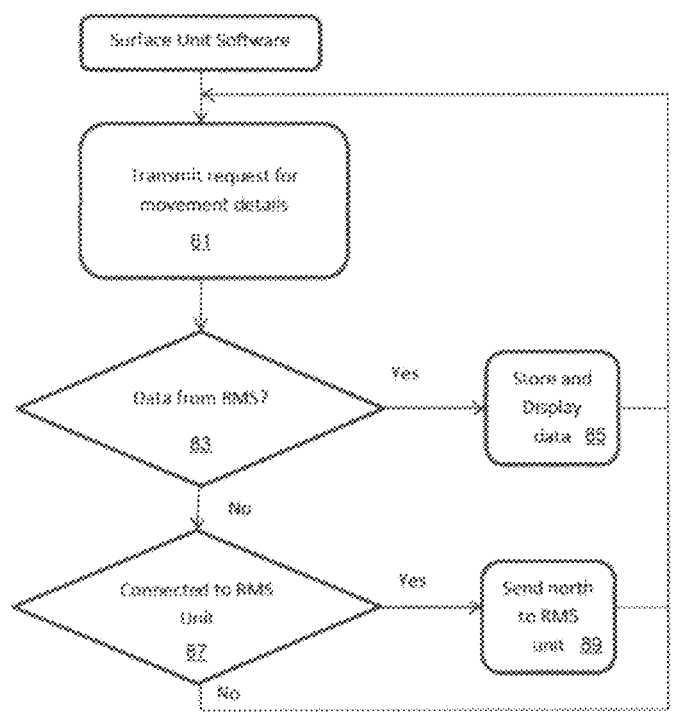
FIG. 9 is a high level flowchart of the software executed by a processor of the surface unit of FIG. 4.

FIG. 9 is a high level flowchart of the software that is stored in memory 56 and executed by the processor 54 of the surface unit 41. At box 81 the surface unit processor 54 operates communications module 47 to transmit a request for movement details, i.e. displacement data, to the rock movement sensor 1.

At box 83 the surface unit processor 54 checks to determine if any data has been received from the RMS 1 via the communications unit 47. If data, i.e. the displacement data associated with a blast or a drop, and RMS ID has been received, then control diverts to box 85 at which the surface unit processor 54 stores the data in memory 56 and displays the data on display 58 for user perusal.

Alternatively, if at box 83 the check for data from the RMS indicates that no data has been received then at box 87 the surface unit processor 54 checks to determine if a data connection has been established between the surface unit 41 and the RMS 1. If there is a data connection then control diverts to box 89. At box 89 the surface unit processor obtains a north heading from the magnetometer 49 and transmits it via communications module 47 to the RMS 1.

An example of the use of the RMS will now be provided with reference to FIGS. 10 to 16.

Figure 10:
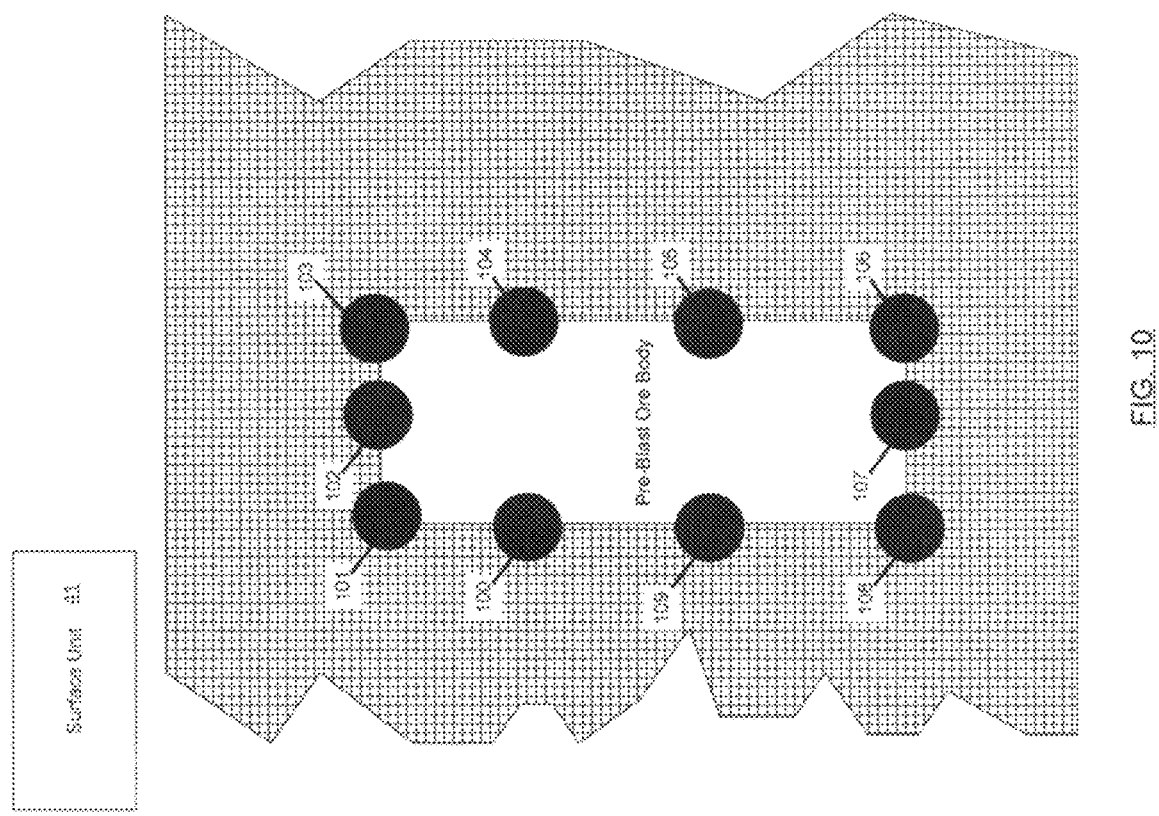
FIGS. 10 to 16 are diagrams illustrating the use of the rock movement sensor.

FIG. 10 is an aerial view showing a pre-blast ore-body which has had a number of survey holes 100 to 109 formed around its perimeter. The three dimensional coordinate of the top of each hole is stored in memory of the surface unit 41 along with the unique ID of a corresponding RMS unit that will be inserted into the hole.

Figure 11:
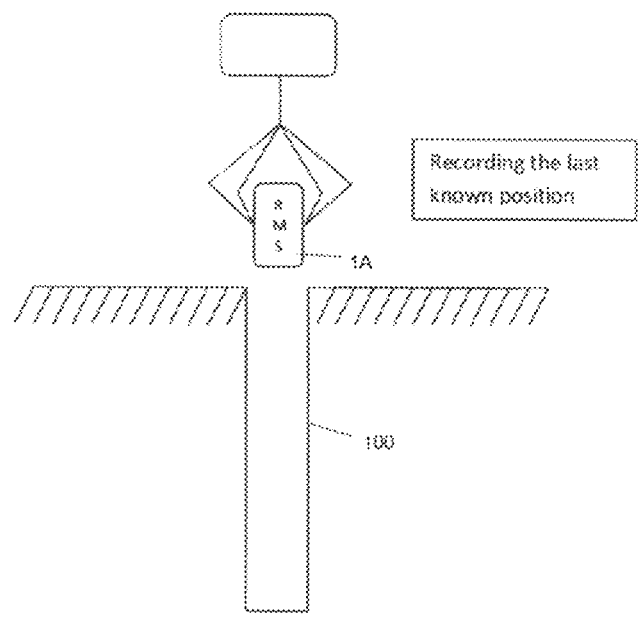

RMS units 1A to 1J (simply indicated as "A" to "J" in FIGS. 13 and 15) are each dropped into one of the holes 100 to 109. For example FIG. 11 shows RMS unit 41 located at the top of survey hole 100. Accordingly, the surface unit records the three dimensional coordinate (e.g. a GPS generated coordinate) for the top of hole 100 in association with the unique identifier for RMS 41A.

Figure 12:
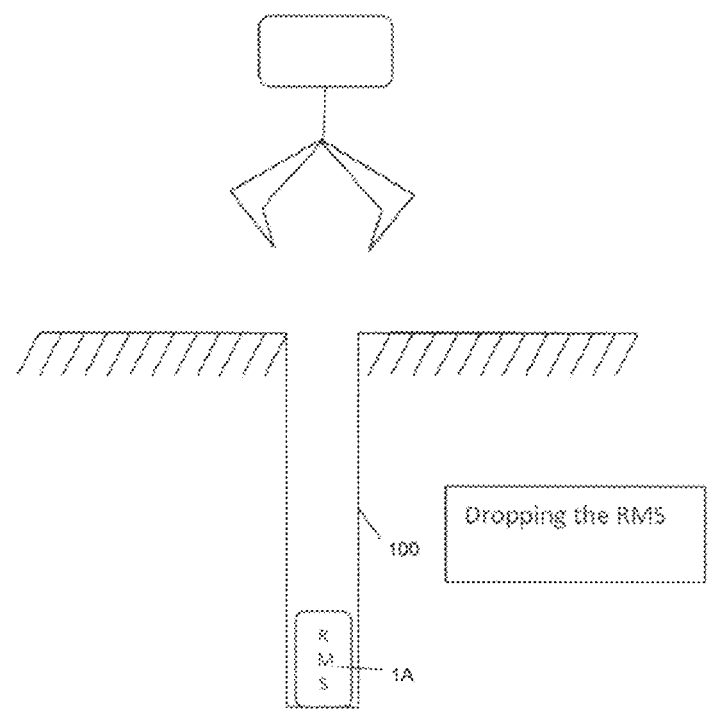

Each of the RMS units 41A to 41J are then dropped into their corresponding survey hole. For example FIG. 12 shows the situation shortly after the RMS unit 41A has been dropped into hole 100. The dropping of the RMS unit 41A constitutes a significant displacement event which the processor inside the RMS detects. The change in position from the top of the hole to the bottom of the hole is recorded in the non-volatile memory within the RMS unit as its pre-blast position.

Figure 13:
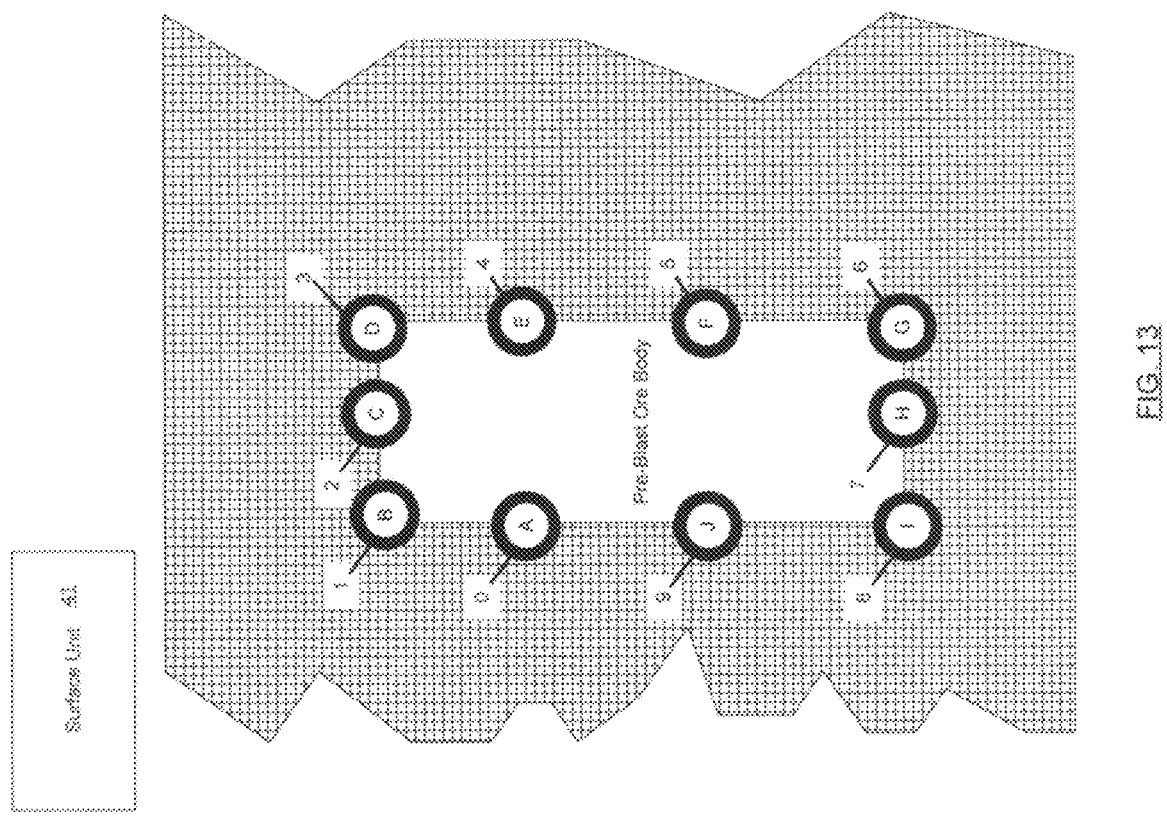

FIG. 13 shows the situation where all of the RMS units 41A to 41J have been dropped into their corresponding survey holes 100 to 109. Accordingly, at this stage the Surface unit has a record of the coordinate for the top of each of the holes and also of a corresponding unique ID for each of the RMS units.

Furthermore, each of the RMS units has detected a drop and stored data indicating the displacement from the top of the hole to the bottom of the hole so that a pre-blast position for each of the RMS units can be readily calculated.

Figure 14:
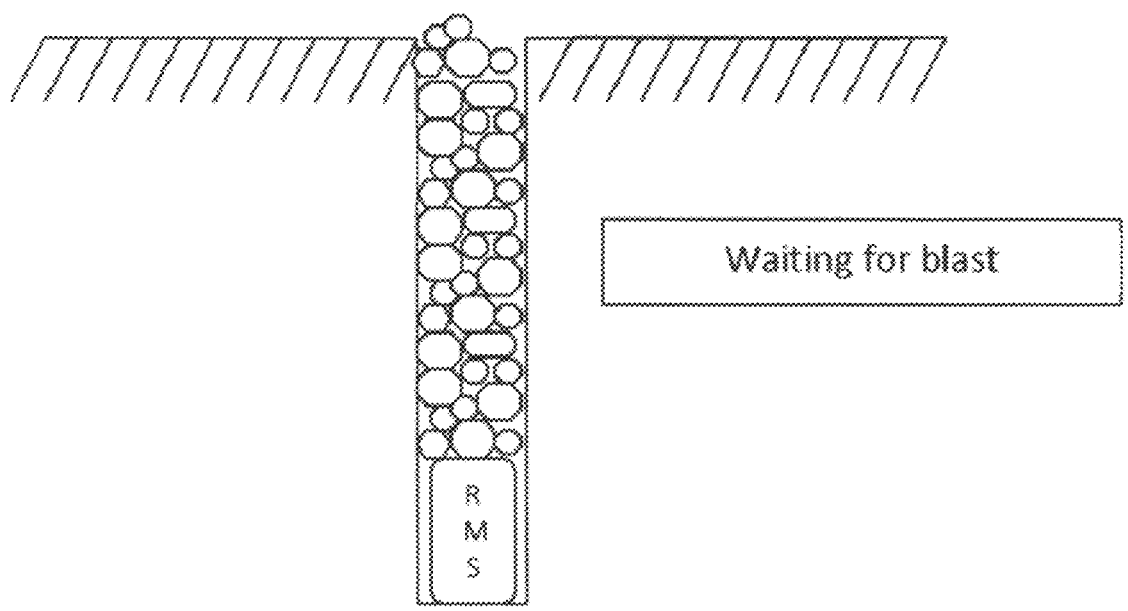
Figure 15:
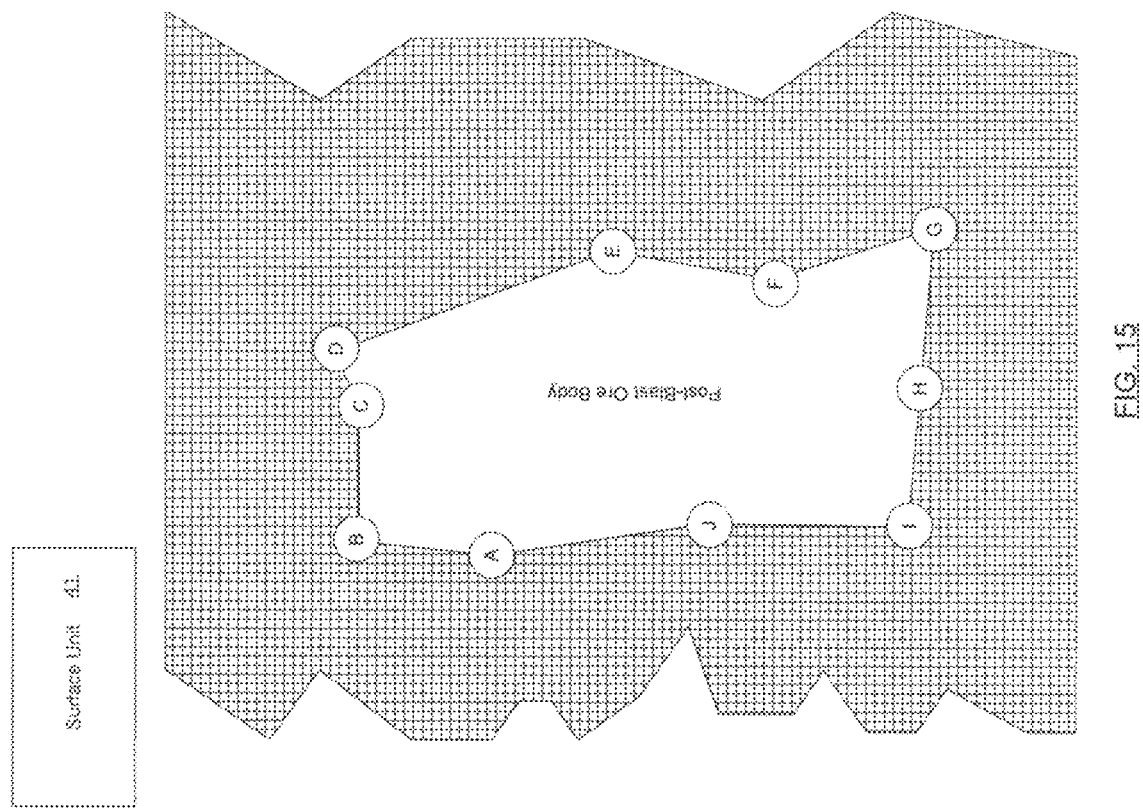
Figure 16:
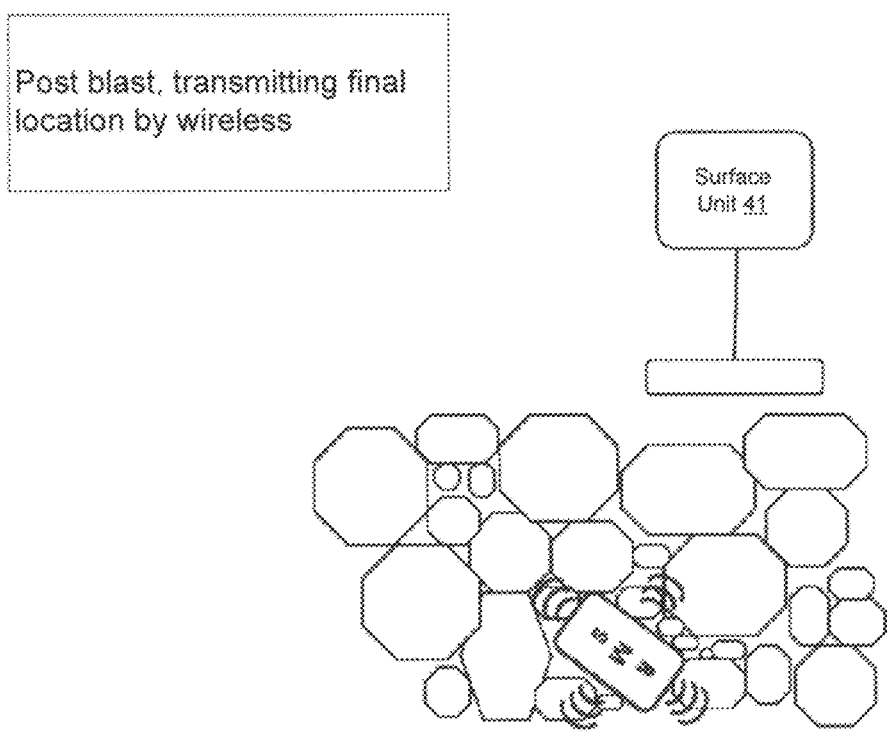

Each survey hole is then filled in prior to the blast as shown in FIG. 14. Subsequent to the blast each of the RMS units is displaced and forms a boundary marker on the post-blast ore body as shown in FIG. 16. The blast constitutes a significant displacement event which each of the RMS units detects. In response to the blast each unit records its trajectory during the blast and the displacement data due to the blast.

Each unit transmits its unique ID and also the displacement data to the surface unit. The surface unit is then, using the unique ID, original top of hole coordinate and drop and blast displacement data, able to calculate the absolute final position of each RMS. That final position information can then be used to correctly locate the post blast ore body for mining purposes.

Figure 17:
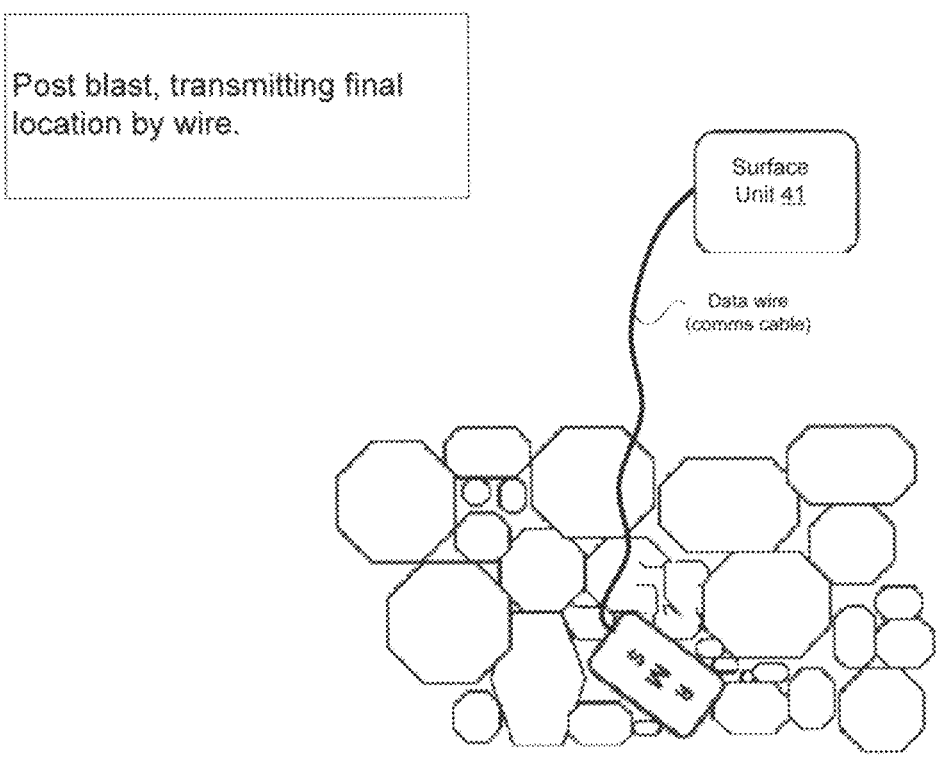
FIG. 17 is a diagram showing an embodiment of the present invention wherein communication between a rock movement sensor and surface unit are established non-wirelessly.

Many variations of the invention possible. For example, in a less preferred embodiment a wired connection such as a communications cable might be connected between the RMS and the surface. Post blast some of the cables will still be connected and a user would be able to retrieve the information from them by connecting the surface unit 41 thereto. This arrangement is shown in FIG. 17. In a further variation a dedicated beacon.

It will be realised that other uses for a RMS according to the present invention are contemplated and encompassed by embodiments of the present invention. For example, the depth and angle of drill holes may be measured using an RMS and surface unit according to the present invention. In that case a light line might be attached at one end to the RMS so that it can be retrieved after the drop.

It will also be understood that the RMS unit is capable of measuring its trajectory during a blast as opposed to just a final position subsequent to the blast. Trajectory information can provide additional data to drill and blast engineers on the dynamics of their blast designs and may be of assistance in improving blast designs.

In a further embodiment of the invention the rock movement sensors may include a locator beacon, for example a radio beacon, so that they can be found subsequent to the blast, retrieved and interrogated to obtain the displacement data.

Throughout the specification and claims if present, unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

The invention claimed is:

1. A rock movement sensor comprising:
   an inertial measurement assembly configured to measure inertia simultaneously in three dimensions and output measured inertia as successive data samples; and
   a processor configured to analyze the successive data samples to detect a significant displacement event associated with a mining activity;
   wherein the processor is further configured to cause, in response to the processor detecting a significant displacement event:
   (i) recording of data samples of the successive data samples to a digital memory; and/or
   (ii) analysis of data samples of the successive data samples.

2. The rock movement sensor of claim 1, wherein the significant displacement event associated with a mining activity comprises a blast or a vertical drop of at least about 400 msecs.

3. The rock movement sensor of claim 1, wherein the processor is configured to select a set of data samples from the successive data samples for analysis, the selected data samples comprising:
   (i) data samples output at or about the commencement of the detected significant displacement event, and/or
   (ii) data samples output at or about the stopping of the detected significant displacement event.

4. The rock movement sensor of claim 1, wherein the analysis caused by the processor provides at least one of a displacement, a trajectory or a destination of the rock movement sensor.

5. The rock movement sensor of claim 1, wherein the recorded and/or analyzed set of data samples comprises data samples from recently before commencement of the significant displacement event and/or recently after stopping of the significant displacement event.

6. The rock movement sensor of claim 1, wherein the processor is configured to analyze current data samples and recently recorded data samples output by the inertial measurement assembly, and a significant displacement event is detected by the processor by analyzing current data with reference to recently recorded data samples.

7. The rock movement sensor of claim 1, wherein the significant displacement event is detected by the processor when one or more of the data samples exceeds a predetermined threshold value.

8. The rock movement sensor of claim 1, wherein the inertial measurement assembly comprises one or more accelerometers, and the significant displacement event is detected by saturation of at least one of the one or more accelerometers.

9. The rock movement sensor of claim 1, wherein the inertial measurement assembly comprises one or more accelerometers and a gyroscope, and the significant displacement event is detected where movement is detected by at least one of the one or more accelerometers and the gyroscope.

10. The rock movement sensor of claim 1, comprising an electronically stored unique identifier code containing rock movement sensor-identifying information.

11. The rock movement sensor of claim 10 comprising a communications module configured to transmit displacement information in association with the unique identifier code.

12. The rock movement sensor of claim 11, wherein the communication module is operably associated with antennae and the unique identifier code is transmitted by orthogonal radio transmission.

13. A method for determining displacement of a rock region from a blasting activity in a mine, the method comprising:
    disposing a rock movement sensor into the rock region, the rock movement sensor comprising:
    an inertial measurement assembly configured to measure inertia simultaneously in three dimensions and output measured inertia as successive data samples; and
    a processor configured to analyze the successive data samples to detect a significant displacement event associated with a mining activity;
    simultaneously measuring inertia in three dimensions and outputting measured inertia as successive data samples;
    analyzing the successive data samples to detect a blasting activity in a mine; and
    in response to the processor detecting a blasting activity the processor further performs:
    (i) recording of data samples of the successive data samples to a digital memory; and/or
    (ii) analyzing data samples of the successive data samples.

14. The method of claim 13, comprising selecting a set of data samples from the successive data samples for analysis, the selected data samples comprising:
    (i) data samples output at or about the commencement of the detected displacement event, and/or
    (ii) data samples output at or about the stopping of the detected significant displacement event.

15. The method of claim 13, wherein the analysis caused by the processor provides a displacement, a trajectory or a destination of the rock movement sensor.

16. The method of claim 13, wherein the recorded and/or analyzed set of data samples comprises data samples from recently before commencement of the significant displacement event and/or recently after stopping of the significant displacement event.

17. The method of claim 13, comprising analyzing current data samples and recently recorded data samples output by the inertial measurement assembly, and a blasting activity is detected by analyzing current data with reference to recently recorded data samples.

18. The method of claim 13, wherein the blasting activity is detected by the processor when one or more of the data samples exceeds a predetermined threshold value.

19. The method of claim 13, wherein the inertial measurement assembly comprises one or more accelerometers, and the blasting activity is detected by saturation of at least one of the one or more accelerometers.

20. The method of claim 13, wherein the inertial measurement assembly comprises one or more accelerometers and a gyroscope, and the blasting activity is detected where movement is detected by at least one of the one or more accelerometers and the gyroscope.

21. The method of claim 13, wherein the rock movement sensor comprises an electronically stored unique identifier code containing rock movement sensor-identifying information.

22. The method of claim 13, wherein the rock movement sensor comprises a communications module, and the method comprises the communications module transmitting displacement information in association with the unique identifier code.

23. The method of claim 22, wherein the communication module is operably associated with antennae and the method comprises transmitting the unique identifier code by orthogonal radio transmission.

* * * * *